United States Patent [19]

Sherman, II

[11] Patent Number: 4,582,503
[45] Date of Patent: Apr. 15, 1986

[54] INJECTION MOLDED UNIVERSAL JOINT

[75] Inventor: William E. Sherman, II, Granger, Ind.

[73] Assignee: Allied Corporation, Morristown, N.J.

[21] Appl. No.: 643,599

[22] Filed: Aug. 23, 1984

[51] Int. Cl.⁴ .......................... F16D 3/26; F16D 3/38
[52] U.S. Cl. ................... 464/139; 464/141; 464/903
[58] Field of Search ............. 464/139, 141, 903, 136, 464/106, 112; 403/57, 58, 74; 308/2 R

[56] References Cited

U.S. PATENT DOCUMENTS

| 1,705,731 | 3/1929 | Hufferd | 464/139 |
|---|---|---|---|
| 2,293,204 | 8/1942 | Greenfield | 464/141 |
| 2,545,646 | 3/1951 | Blinkman | 64/17 |
| 2,914,361 | 11/1959 | Turner | 308/2 R |
| 3,217,516 | 11/1965 | Runkle | 464/139 |
| 3,296,830 | 1/1967 | Runkle | 64/17 |
| 3,310,959 | 3/1967 | Sheppard | 464/139 |
| 3,376,713 | 4/1968 | Runkle | 64/17 |
| 3,877,253 | 4/1975 | Yeagle | 464/903 X |
| 3,878,695 | 4/1975 | Pitner | 64/11 |
| 4,075,871 | 2/1978 | Burke | 64/17 |

FOREIGN PATENT DOCUMENTS

| 123429 | 2/1901 | Fed. Rep. of Germany. | |
| 3336454 | 4/1984 | Fed. Rep. of Germany | 464/112 |
| 1299989 | 6/1962 | France | 464/139 |
| 2021759 | 7/1970 | France. | |

Primary Examiner—Stuart S. Levy
Assistant Examiner—Thomas R. Hannon
Attorney, Agent, or Firm—Larry J. Palguta; Ken C. Decker

[57] ABSTRACT

An injection molded universal joint (10) includes a central retaining member (40) captured between spherical balls (30, 32, 34, 36) seated in bores (22, 24, and 26, 28) located in diametrically opposed arms (14, 16, and 18, 20) of respective shaft members (11, 12). The spherical balls are each pressed through an associated bore until a portion of the ball extends radially inwardly of the arm, and then maintained in position by a plastic material (80) insert molded into and retained in the bore. The insert molded plastic material (80) retains each of the spherical balls in place and permits the central retaining member (40) to be accurately positioned and with a predetermined preload applied to the universal joint (10).

9 Claims, 2 Drawing Figures

INJECTION MOLDED UNIVERSAL JOINT

The invention relates to an injection molded universal joint for use in a steering column.

Many automotive vehicles utilize a tilt steering wheel mechanism which may be adjusted according to the desire of the vehicle operator. Thus, the tilt steering wheel mechanism compensates for the wide variety in sizes of vehicle drivers and contributes significantly to the comfort of the driver during operation of the vehicle.

It is desirable to provide a universal joint for use in such a tilt steering mechanism, wherein the universal joint may be easily and inexpensively manufactured, while eliminating many of the problems of prior universal joint assemblies. The universal joint should be designed to require few components, simplified assembly, and enhanced reliability over previous universal joint designs. The universal joint should be able to withstand high load forces and yet be relatively small in size. It is preferable that the design solve the problems of adjustment caused by oscillating torque and movement of joint members under load forces. Additionally, it would be desirable if each axis of the universal joint could be set independently of the other and thus eliminate the matching of parts for the respective upper and lower yokes.

The invention comprises a universal joint having shaft members each terminating in a pair of diametrically opposed arms. Each arm has a through bore disposed oppositely from the bore in the other arm, with a spherical ball having been pressed through the bore until a portion of the spherical ball extends radially inwardly of the diametrically opposed arms. Located between the arms of each member is a central retaining member that is generally a square-shaped block. Located within four surfaces of the central retaining member are four annular recesses for receiving the radially inwardly protruding portions of the spherical balls. The spherical balls are maintained in position by plastic material injection molded into the respective bores after the spherical balls have been press fitted therethrough. Each of the spherical bores may have a groove disposed about the bore so that injection molded plastic will extend into the groove and provide an anchoring means for retaining the molded plastic within the bore, or a snap ring may be inserted into the groove prior to injection molding so that after the molding is completed, the snap ring provides a secure radially inward extension that will anchor the plastic material in the respective bore.

The invention is described in detail below with reference to the drawings which illustrate an embodiment, in which.

Figure 1:
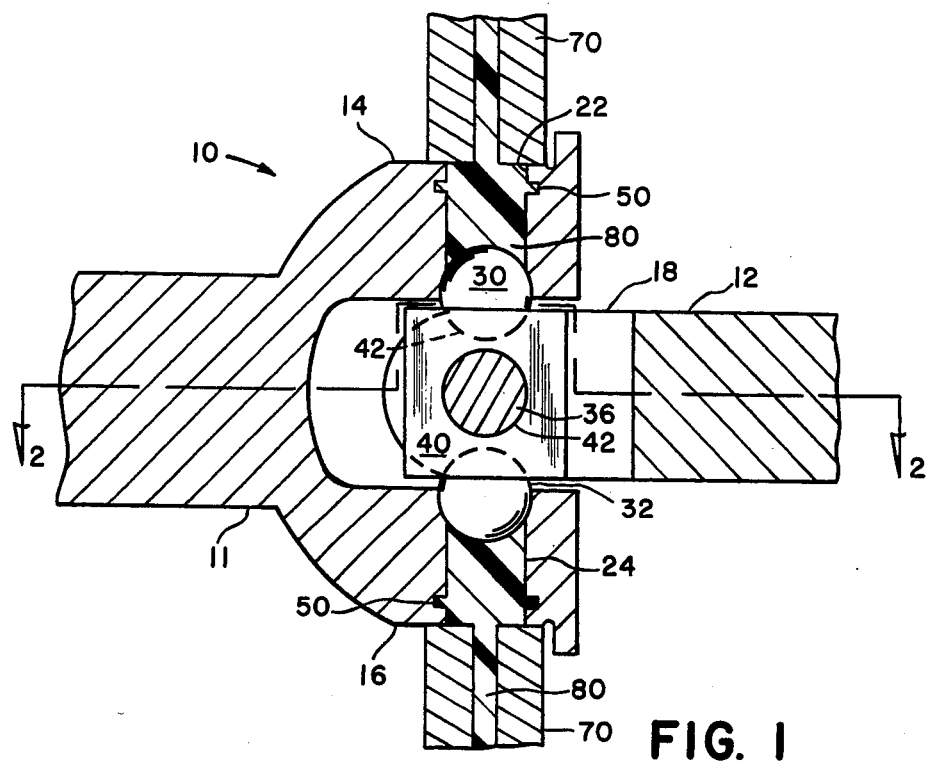
FIG. 1 is a cross section of the universal joint during the injection molding process.

Referring to the Figures, the universal joint is designated generally by reference numeral 10. Universal joint 10 includes a pair of rotatable members comprising a first shaft 11 and second shaft 12 having arms 14, 16 and 18, 20, respectively, at ends thereof. Diametrically opposed bores 22 and 24 are located in arms 14 and 16 of first shaft 11, whereas diametrically opposed bores 26 and 28 are located in arms 18 and 20. It should be noted that the bores 22 and 24 of the first shaft 11 are centered in the same plane, with bores 26 and 28 of second shaft 12 located at right angles with respect thereto. Spherical balls 30, 32, 34, and 36 are press fitted through their associated bores until they extend radially inwardly of the associated arm. Located within the arms 14, 16 and 18, 20 is a central retaining member 40 which is generally square shaped and has a plurality of annular seats 42 located in four surfaces thereof. Each of the annular seats 42 contains a curvature of radius complementary to the curvature of radius of the spherical balls, and receives a ball therein so that the central retaining member 40 couples together first shaft 11 and second shaft 12. From the foregoing description, it is obvious that the shafts 11 and 12 are coupled together so that they may be rotated with their axes angularly disposed with respect to one another, and provide a universal joint suitable for use within a steering column.

Figure 2:
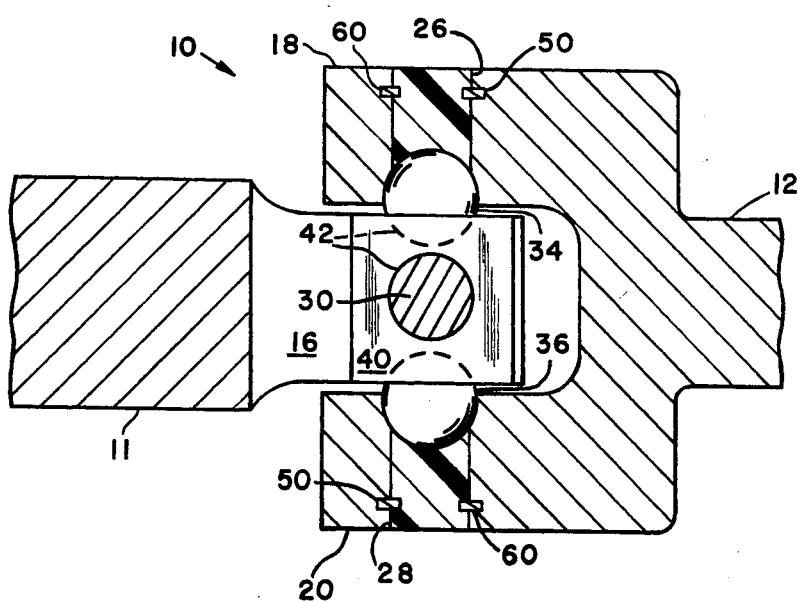
FIG. 2 is a cross section taken along view line 2—2 of FIG. 1 after assembly of the universal joint has been completed.

The spherical balls 30, 32, 34, and 36 are maintained within their associated bores by means of a plastic material which has been injection molded within the bores. Within each bore 22, 24 and 26, 28 is located an annular groove 50 that provides an anchoring recess for injection molded material so that the molded material will not be forced radially outwardly of the bores in arms 14, 16, 18, 20 during operation of the universal joint. Alternatively, washers or snap rings 60 (see FIG. 2) may be inserted into the grooves 50 prior to the injection molding process, whereby rings 60 extend radially inwardly of the bores and provide secure anchorings for the injection molded material.

FIG. 1 illustrates the method for injection molding the plastic material. The injector nozzles 70 contact opposed arms 14 and 16 and the plastic material 80 is injected directly into bores 22 and 24. There are many types of plastic materials that are suitable for use in the present invention, and an illustrative example would be a 30% glass-filled nylon such as Dupont's "Zytel" ®. Each shaft would be assembled separately with central retaining member 40, resulting in the position of central retaining member 40 being accurately established, and the preload of the arms effected by inward movement of the injector nozzles 70. Thus, the preloading of two arms of the joint is effected separately from the same procedure subsequently used for the two arms of the other shaft. This eliminates the required matching of upper and lower yoke parts in order to center the retaining member 40, as happens in the assembly of prior art universal joints. In addition, the central retaining member may be a solid, integral part instead of a pair of parts connected together by a bolt and nut. A torque adjustment may be effected by merely varying the press load of the ball, the pressure of the injected plastic, and the clamp load on the arms.

The present invention provides an assembly method which permits the preloading and retaining of components to produce a compact, high load, small universal joint with a resulting economy of components and assembly. The universal joint is stronger, consists of fewer parts, and does not have the inherent problem of mismatched parts.

Although this invention has been described in connection with the illustrated embodiment, it will be obvious to those skilled in the art that various changes may be made in the form, structure, and arrangement of parts without departing from the invention.

I claim:

1. A universal joint comprising two members capable of being rotated with their axes angularly disposed with respect to one another, a pair of spaced arms located at the end of each of said members and each arm having an opening therein, each of the openings extending through the associated arm, diametrically opposed spherical surfaces connected to and each protruding from a respective opening in the arms of each of said members, said spherical surfaces of one of said members being centered in the same plane with the spherical surfaces of the other of said members but at right angles with respect thereto, coupling means having seats for receiving said spherical surfaces, said seats including curved surfaces having a radius substantially equal to that of said spherical surfaces and for maintaining contact with said spherical surfaces in order to eliminate lash in any direction of movement, material for connecting said spherical surfaces to the respective members and maintaining the spherical surfaces in contact with said seats, said material comprising a plastic material disposed within the openings of the arms, and a protrusion extending into each of said openings, said protrusion encompassed by said plastic material and providing anchoring of the plastic material relative to the respective member, each protrusion preventing said plastic material from moving relative to the respective arm in order to prevent movement of the spherical surface protruding from the associated opening, said spherical surfaces comprising balls pressed radially inwardly through the respective openings until portions thereof protrude from the openings and radially inwardly of the spaced arms, the balls connected to the members by said plastic material which is injection molded into the openings.

2. The universal joint in accordance with claim 1, wherein the coupling means comprises a substantially square-shaped unitary block having said seats disposed about the perimeter thereof.

3. The universal joint in accordance with claim 1, wherein said protrusion comprises a snap ring, each opening including an annular groove receiving and anchoring therein the respective snap ring.

4. The universal joint comprising two members capable of being rotated with their axes angularly disposed with respect to one another, a pair of spaced arms located at the end of each said members and each arm having an opening therein, diametrically opposed spherical surfaces connected to and each protruding from a respective opening in the arms of each of said members, said spherical surfaces of one of said members being centered in the same plane with the spherical surfaces of the other of said members but at right angles with respect thereto, coupling means having seats for receiving said spherical surfaces, said seats including curved surfaces having a radius substantially equal to that of said spherical surfaces and for maintaining contact with said spherical surfaces in order to eliminate lash in any direction of movement, material for connecting said spherical surfaces to the respective members and maintaining the spherical surfaces in contact with said seats, said material comprising a plastic material disposed within the openings of the arms, said openings each extending through the associated arm and having a groove in communication therewith, the grooves receiving therein said plastic material in order to anchor the latter, said spherical surfaces comprising balls pressed radially inwardly through the respective openings until portions thereof protrude from the openings and radially inwardly of the spaced arms, the balls connected to the members by said plastic material which is injection molded into the openings.

5. The universal joint in accordance with claim 4, wherein the coupling means comprises a substantially square-shaped unitary block having said seats disposed about the perimeter thereof.

6. A universal joint comprising two rotatable members capable of being rotated with their axes angularly disposed with respect to one another, a pair of spaced arms located at the end of each of said rotatable members, diametrically opposed bores extending through the arms of each of said rotatable members, said bores of one of said members being centered in the same plane with the bores of the other of said members but at right angles with respect thereto, a ball pressfit through and maintained within each of said bores and protruding radially inwardly from the bore, coupling means for joining said rotatable members and including spherical seats for receiving said balls, said spherical seats shaped complementary to said balls, and a plastic material disposed in said bores to substantially fill each of said bores and fixedly positioning said balls with respect to each of said bores, the plastic material injection molded to intimately engage respective portions of said balls and maintain the positions of said spherical balls relative to the respective spaced arms and spherical seats in order to provide a lash-free universal joint.

7. The universal joint in accordance with claim 6, further comprising a protrusion in each of said bores, said protrusion encompassed by said plastic material and providing anchoring of the plastic material relative to the respective member.

8. The universal joint in accordance with claim 6, further comprising a plurality of grooves in the arms and each communicating with a respective opening, the grooves receiving therein said plastic material.

9. The universal joint in accordance with claim 6, wherein the coupling means comprises a substantially square-shaped unitary block having said seats disposed about the perimeter thereof.

* * * * *